United States Patent
Benhase et al.

(10) Patent No.: US 7,337,277 B2
(45) Date of Patent: Feb. 26, 2008

(54) APPARATUS, SYSTEM, AND METHOD FOR FLUSHING CACHE DATA

(75) Inventors: Michael Thomas Benhase, Tucson, AZ (US); Stephen LaRoux Blinick, Tucson, AZ (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 10/991,931

(22) Filed: Nov. 18, 2004

(65) Prior Publication Data

US 2006/0106990 A1    May 18, 2006

(51) Int. Cl.
    *G06F 12/00* (2006.01)
(52) U.S. Cl. .................. 711/135; 711/103
(58) Field of Classification Search ........... None
    See application file for complete search history.

(56) References Cited

U.S. PATENT DOCUMENTS

| | | | |
|---|---|---|---|
| 5,677,890 A | 10/1997 | Liong et al. ............ 365/229 |
| 5,784,548 A | 7/1998 | Liong et al. .......... 395/182.04 |
| 5,809,311 A * | 9/1998 | Jones .................... 713/300 |
| 6,239,578 B1 | 5/2001 | Schnell et al. .......... 320/119 |
| 6,463,507 B1 | 10/2002 | Arimilli et al. .......... 711/122 |
| 6,567,899 B2 | 5/2003 | Ghosh et al. ............ 711/156 |
| 6,658,542 B2 | 12/2003 | Beardsley et al. ........ 711/162 |
| 2003/0233613 A1 | 12/2003 | Ash et al. ................ 714/799 |
| 2006/0031407 A1* | 2/2006 | Dispensa et al. .......... 709/219 |

FOREIGN PATENT DOCUMENTS

| | | |
|---|---|---|
| EP | 0 543 582 | 5/1993 |
| JP | 04-296954 | 10/1992 |
| JP | 2001-034535 | 2/2001 |

* cited by examiner

*Primary Examiner*—Reginald Bragdon
*Assistant Examiner*—Mehdi Namazi (57) ABSTRACT

An apparatus, system, and method are disclosed for flushing cache data in a cache system. The apparatus includes a zero module and a flush module. The zero module executes an internal processor instruction to zero out a zero memory segment of a nonvolatile memory and a processor cache in response to a loss of primary power to the processor cache. The flush module flushes modified data from an address in the processor cache to a flush memory segment of the nonvolatile memory before the zero module puts a zero in the address. Advantageously, the zero memory segment is reserved within the memory and used to zero out the processor cache, effectively flushing the existing data from the processor cache to a flush memory segment of the memory.

31 Claims, 6 Drawing Sheets

APPARATUS, SYSTEM, AND METHOD FOR FLUSHING CACHE DATA

BACKGROUND

1. Technological Field

This invention relates to flushing cache data and more particularly relates to flushing modified cache data from a processor cache to nonvolatile memory in response to power loss.

2. Background Technology

A cache within a computer is a portion of memory or disk storage that is used to store recently accessed files, instructions, or other data. By storing the recently accessed data in a cache, the data may be available for future data requests that attempt to access the same data. By storing data in a cache, rather than in slower memory or storage devices, the performance of the computer system may be increased.

Some of the fastest data accesses and, hence, best performance levels are available through the use of internal caches that are built into a processor, such as a central processing unit (CPU) of a storage controller. The cache may be integrated into the same package as the processor and may be on the same die as the processor. Currently available processors may include both level one (L1) and level two (L2) on-die caches.

In order to write data to persistent storage, such as a hard disk or tape, the computer system may first store the data in an internal processor cache, then write the data to an external random access memory (RAM), and then write the data to the persistent storage medium. Unfortunately, the data may be lost in transfer due to unexpected power failures.

Figure 1:
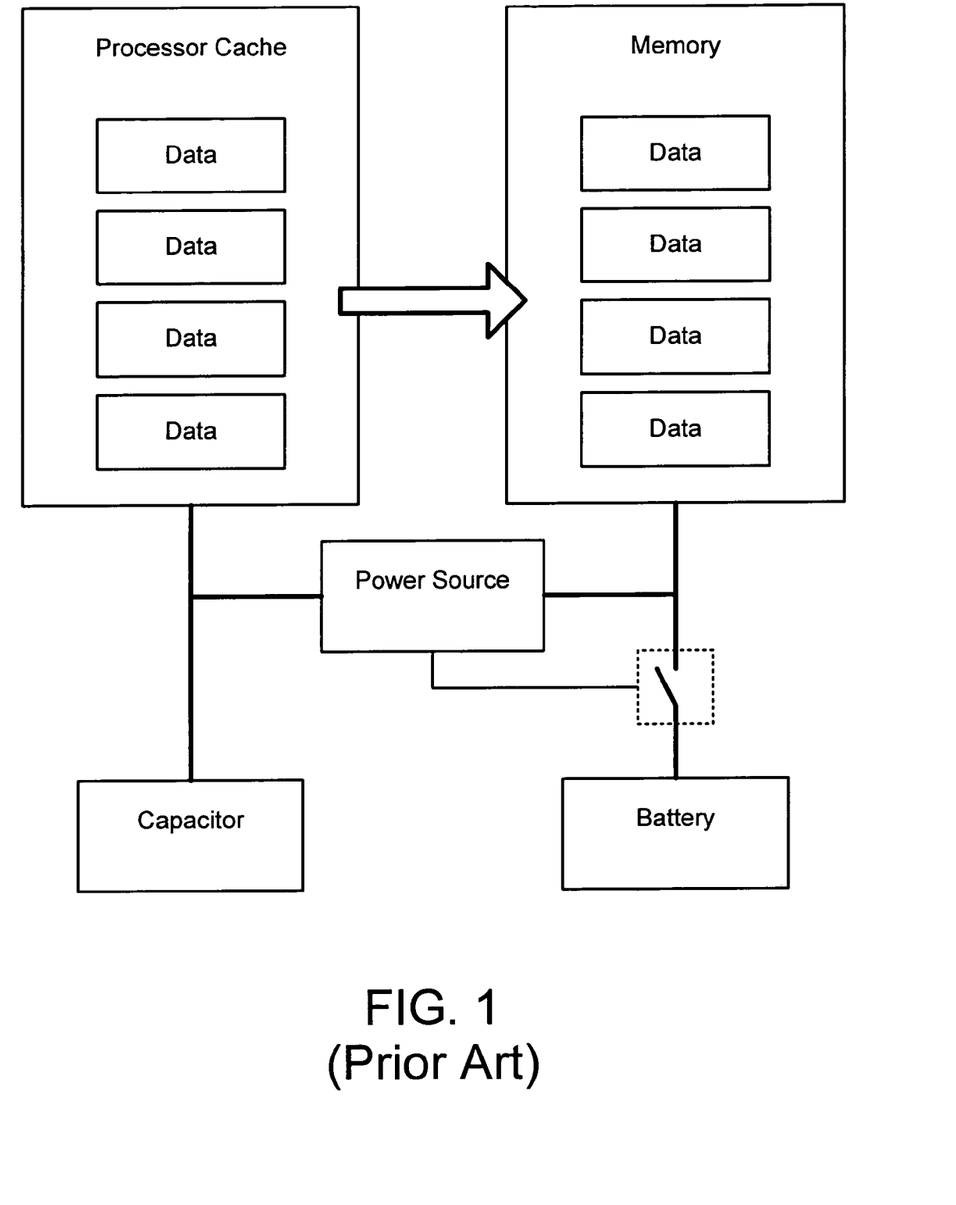
FIG. 1 is a schematic block diagram illustrating a conventional cache system.

FIG. 1 shows a conventional cache system that includes an internal processor cache and a RAM. Under normal operating conditions, data on the processor cache is written to the RAM (indicated by the arrow) before being written to a persistent storage device (not shown). The processor cache and RAM are typically powered by a primary power source that originates within the computer system from a direct current (DC) power supply. The data may be lost if the power source fails before the data is written to the RAM.

The data may be lost in the event of a power failure even after it is written to the RAM. However, RAM may be backed up by a battery or other secondary power source. Such RAM or other memory that is backed up by a secondary power source is referred to herein as battery-backed memory (BBM) or nonvolatile memory. For example, battery-backed memory (BBM) may self-refresh and maintain the data for long periods of time (typically 72 hours). As used herein, nonvolatile memory includes battery-backed memory (BBM) as well as other types of memory that are nonvolatile, regardless of the presence of a secondary power source.

Referring still to FIG. 1, if the primary power source fails before the data is written from the processor cache to the RAM, there may be a fraction of time after the power failure to attempt to transfer the data to the RAM. For example, the processor may remain powered by one or more power supply capacitors for as long as 60-70 ms before the capacitors are drained and the processor stops working. In fact, capacitor sources have been designed to provide power to a processor for a specific amount of time in order to attempt to gave the data in the processor cache. However, the size and the expense of these capacitor sources increases as the time required to power the processor increases. Therefore, it maybe difficult to implement conventional cache flush operations without unduly increasing the cost of the capacitor sources or consuming significant space within the computer system.

One way in which this problem has conventionally been solved is through the use of a large battery or uninterruptible power supply (UPS) to power the entire computer system. For example, a UPS may power the computer system for 30 minutes, giving a user enough time to properly shut down the system and avoid the problem of losing data from the processor cache. However, this solution requires the high costs of purchasing and installing the UPS, as well as the physical space to locate the external UPS package near the system.

Figure 2:
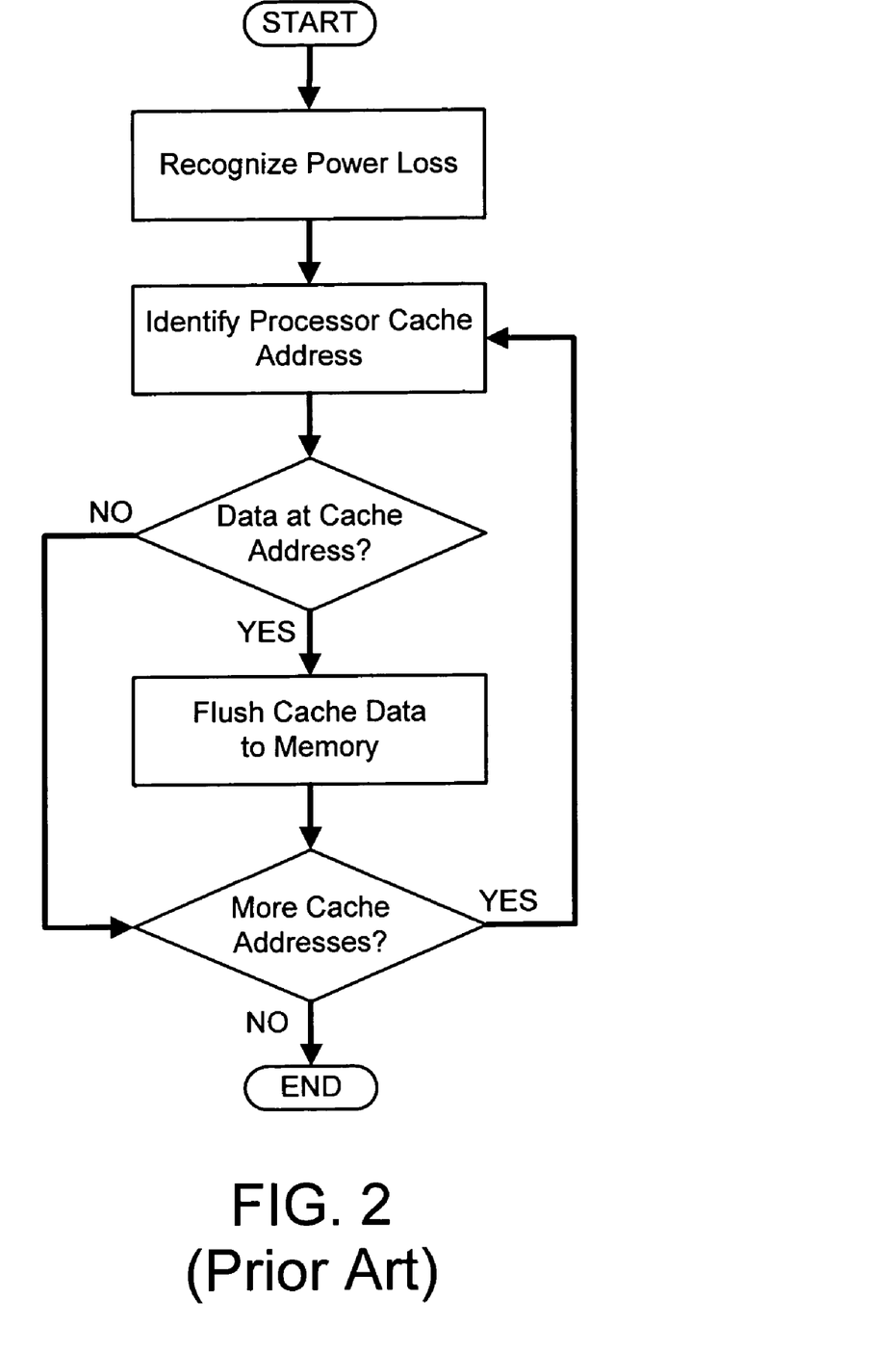
FIG. 2 is a schematic flow chart diagram illustrating a conventional cache flush method.

Another way in which this problem has conventionally been solved is through iterative execution of selective, flush instructions, which is depicted generally in FIG. 2. A processor may have an internal instruction to check an address for data and flush the data, if any, from that address to memory. However, going through every address of data that could exist in the cache takes a relatively long time that is not guaranteed to be less than the amount of time the processor might be powered by the capacitor source after power failure.

Figure 3:
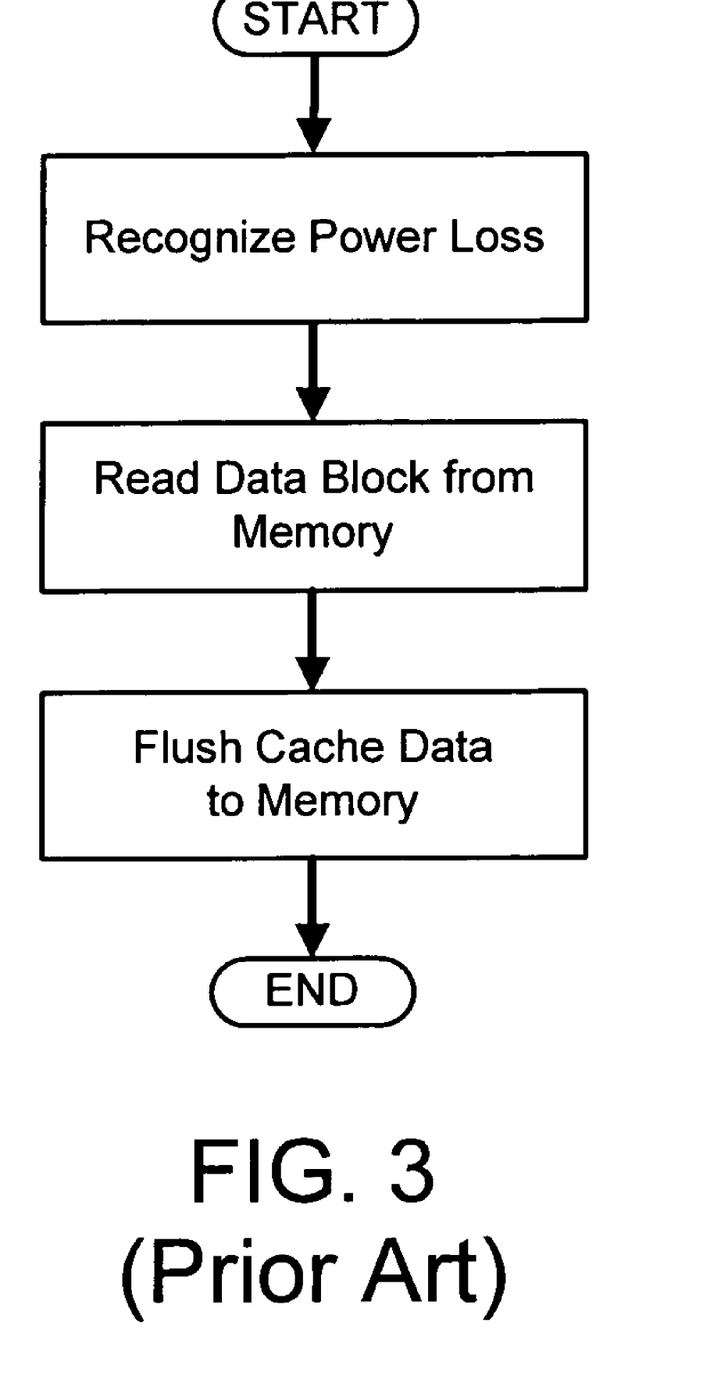
FIG. 3 is a schematic flow chart diagram illustrating another conventional cache flush method.

Another way in which this problem has conventionally been solved is through the use of sequential RAM loads, which is depicted generally in FIG. 3. A RAM load refers to loading data from the RAM into the processor cache. In order to load the data from the RAM into the processor cache, the existing data from the processor cache has to be written out to the RAM. In other words, a RAM load forces the processor cache to write its current data out to the RAM in order to make room for the new data. By executing a RAM load of sequential addresses equal to the size of the processor cache, the processor cache must push all of the existing data into the RAM.

Unfortunately, the read time for a RAM load can be very slow relative to the time available to flush the processor cache. Therefore, the use of sequential RAM loads can be very slow relative to the amount of time the processor might be powered by the capacitor source after power failure. Additionally, RAM reads do not flush any processor cache data associated with the target read address. Although a sequential RAM load double the size of the processor cache can eliminate this issue, the execution time for such a RAM load also doubles.

From the foregoing discussion, it should be apparent that a need exists for an apparatus, system, and method for rapidly flushing cache data from a processor cache to nonvolatile memory, such as battery-backed memory (BBM), in response to a power loss. Beneficially, such an apparatus, system, and method would overcome the present flushing challenges that require significant power and/or processing time.

SUMMARY

The several embodiments of the present invention have been developed in response to the present state of the art, and in particular, in response to the problems and needs in the art that have not yet been fully solved by currently available cache flushing systems. Accordingly, the present invention has been developed to provide an apparatus, system, and method for flushing a processor cache that overcome many or all of the above-discussed shortcomings in the art.

The apparatus to flush cache data is provided with a logic unit containing a plurality of modules configured to functionally execute the necessary operations for a cache flush in response to a loss of primary power. These modules in the described embodiments include a power monitor module, a flush module, a zero module, and a memory reservation module.

In one embodiment, the power monitor module monitors the primary power source. The power monitor module also may recognize a loss of primary power to the processor cache.

In one embodiment, the flush module flushes modified data from the processor cache to a nonvolatile memory, such as battery-backed memory (BBM), in response to a loss of primary power to the processor cache. Alternatively, the flush module flushes the modified data in response to an operation to zero out the processor cache. In one embodiment, the flush module flushes the modified data to a flush memory segment, but not to a zero memory segment, of the nonvolatile memory. In another embodiment, the flush module flushes the modified data from the processor cache before any data is read from the memory to the processor cache. In other words, the modified data may be flushed without the need for any RAM loads.

In one embodiment, the zero module executes an internal processor instruction to zero out the zero memory segment of the memory and, correspondingly, to zero out the processor cache. Furthermore, the zero module may execute the zero out command in response to a loss of primary power to the processor cache.

In one embodiment, the memory reservation module reserves the zero memory segment within the nonvolatile memory. By reserving the zero memory segment, the memory reservation module prevents critical data from being written to the zero memory segment of the memory. In this way, critical data will not be lost if the zero memory segment is zeroed out by the zero module. It may be possible, however, to use the zero memory segment as a scratch buffer during normal operation of the cache system. In one embodiment, the memory reservation module may reserve a zero memory segment that is approximately equal to the size of the processor cache. Alternatively, the memory reservation module may reserve a zero memory segment that is larger than the size of the processor cache.

A system of the present invention is also presented to flush cache data. In one embodiment, the system may be embodied in a cache system including a processor, an internal processor instruction, and a flush apparatus. The processor is coupled to a processor cache. The internal processor instruction is a zero out instruction to zero out a memory segment of a nonvolatile memory. The flush apparatus executes the zero out instruction and flushes modified data from the processor cache to a flush memory segment in response to a loss of primary power to the processor cache. In particular, the system may be embodied in a storage controller having a processor, a processor cache, and a battery-backed RAM.

Another embodiment of the system may include a processor cache, a nonvolatile memory, and a flush apparatus. The processor cache may have a capacitor as a secondary power source. Similarly, the nonvolatile memory may have a battery as a secondary power source.

A signal bearing medium is also presented to store a program that, when executed, performs one or more operations to flush cache data. In one embodiment, the operations include executing an internal processor instruction to zero out a zero memory segment of a nonvolatile memory and a processor cache in response to a loss of primary power to the processor cache, and flushing modified data from an address in the processor cache to a flush memory segment of the nonvolatile memory before the zero module puts a zero in the address.

In another embodiment, the operations also may include reserving the zero memory segment in the nonvolatile memory, recognizing the loss of primary power to the processor cache, and/or flushing all of the modified data to the flush memory segment before the processor cache reads any data from the nonvolatile memory. In another embodiment, reserving the zero memory segment may include reserving a zero memory segment that is approximately equal in size to the processor cache or reserving a zero memory segment that is larger in size than the processor cache.

A method is also presented for deploying a computing infrastructure. The computing infrastructure includes computer-readable code integrated into a computing system. In one embodiment, the computer-readable code, in combination with the computing system, is capable of flushing cache data. In particular, the method in the disclosed embodiments substantially includes deploying code that enables the operations necessary to carry out the functions presented above with respect to the operation of the described apparatus and system. Furthermore, some or all of the operations of the code may be substantially similar to the operations that are performed when the program on the signal bearing medium is executed.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 4:
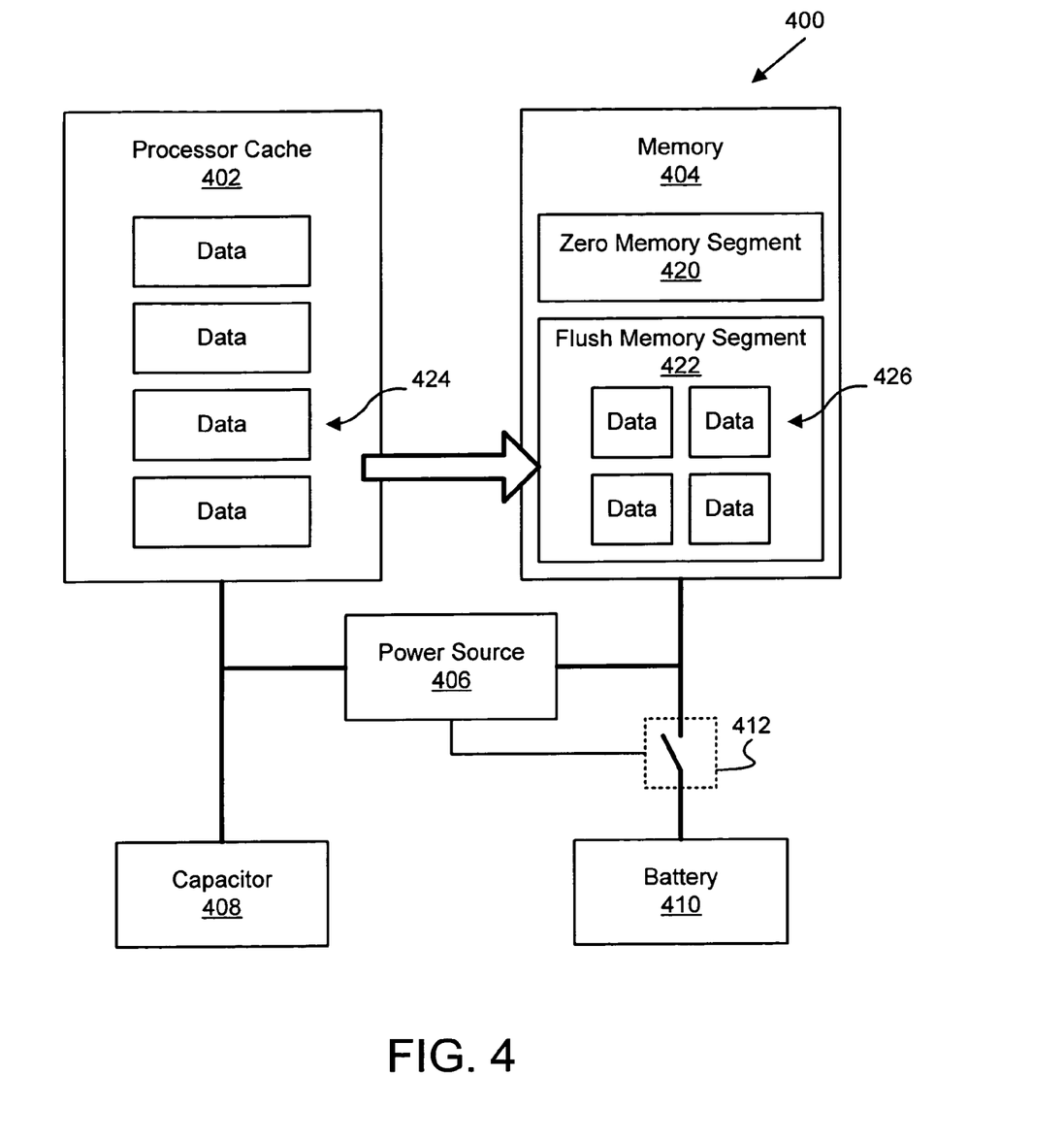
FIG. 4 is a schematic block diagram illustrating one embodiment of a cache system.

FIG. 4 depicts one embodiment of a cache system 400 that overcomes many or all of the disadvantages of conventional cache flushing technologies. The illustrated cache system 400 includes a processor cache 402, a nonvolatile memory 404, and a power source 406. In one embodiment, the power source 406 supplies electrical power to both the processor cache 402 (via a processor) and the memory 404. Alternatively, the processor cache 402 and the memory 404 may be powered by independent power sources.

The cache system 400 also includes a capacitor source 408 and a battery source 410. The capacitor source 408 is coupled to the processor cache 402 and supplies secondary power to the processor cache 402 in response to a failure of the primary power source 406. In one embodiment, the capacitor source 408 may include a single capacitor or a plurality of capacitors. Similarly, the battery source 410 is coupled to the memory 404 and supplies power to the memory 404 in response to a failure of the primary power source 406. In one embodiment, the battery source 410 may include a single battery or may include a plurality of batteries. Additionally, the battery source 410 may be coupled to the memory 404 via a switch 412 that closes upon failure of the primary power source 406.

The processor cache 402 may be any level of cache and may or may not be on-die with the processor (not shown). In one embodiment, the processor cache 402 may be coupled to an onboard storage processor within a storage controller (not shown). The nonvolatile memory 404 may be any type of memory that maintains data in the event of a loss of power by the power source 406, including volatile memory connected to a secondary power supply. In one embodiment, the memory 404 is synchronous dynamic random access memory (SDRAM) coupled to the battery source 410.

The illustrated memory 404 includes at least two segments, which are identified as the zero memory segment 420 and the flush memory segment 422. The zero memory segment 420, in one embodiment, is the same size as the processor cache 402. In another embodiment, the zero memory segment 420 is larger than the processor cache 402. The flush memory segment 422 may include the remainder of the memory 404 or a portion of the remainder of the memory 404. In one embodiment, for example, the processor cache 402 may be 2 megabytes (Mb) and the memory 404 may be 2 gigabytes (Gb). Out of the 2 Gb of memory 404, the zero memory segment 420 may be 2 Mb and the flush memory segment 422 may be 1.998 Gb. Alternatively, the zero memory segment 420 may be 5 Mb and the flush memory segment may be 1.995 Gb.

The zero memory segment 420 is maintained, in one embodiment, as a type of scratch buffer within the memory 404. The zero memory segment 420 specifically may be used to zero out the processor cache 402 in response to a failure of the power source 406. In one embodiment, the zero out instruction is internal to the processor to which the processor cache 402 is coupled. The zero out instruction is intended, in one embodiment, to place zeros in all of the indicated addresses within the memory 404.

Under normal operating conditions, the data 424 on the processor cache 402 is written (indicated by the arrow) to the memory 404 before being written to a persistent storage device (not shown). In the case of a power failure, the zero out instruction may be used to zero out the zero memory segment 420. However, the zero out instruction places a corresponding number of zeros in the processor cache 402 to zero out the processor cache 402 prior to writing zeros in all of the addresses within the zero memory segment 422.

In order to zero out the processor cache 402, the processor cache 402 flushes all of the modified data 424 within the processor cache 402 out to the memory 404. In one embodiment, the processor cache 402 flushes the data 424 to the flush memory segment 422 of the memory 404. After the processor cache 402 is zeroed out, it is possible for some of the zeros in the processor cache 402 to be written to the memory 404. Therefore, maintaining a dedicated zero memory segment 420 provides a location to write the zeros within the memory 420 that will not affect the data 426 written to the flush memory segment 422.

Figure 5:
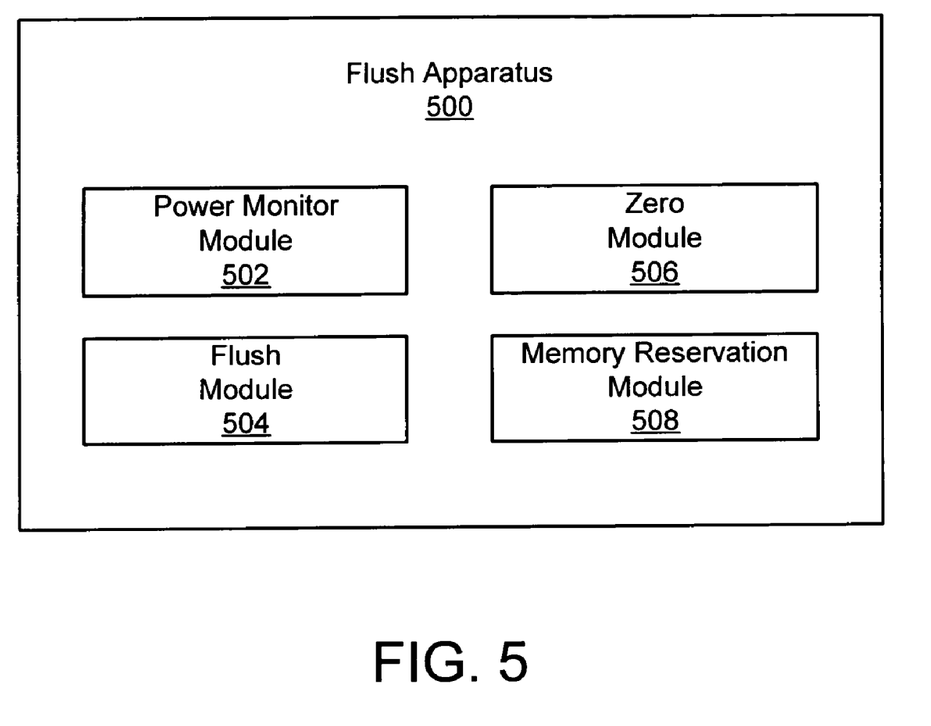
FIG. 5 is a schematic block diagram illustrating one embodiment of a flush apparatus.

FIG. 5 is a schematic block diagram illustrating one embodiment of a flush apparatus 500. The flush apparatus 500 may be coupled to the cache system 400 of FIG. 4 to facilitate a cache flush operation in response to a loss of the primary power source 406. In one embodiment, the flush apparatus 500 maybe integrated within the processor to which the processor cache 402 is coupled. The illustrated flush apparatus 500 includes a power monitor module 502, a flush module 504, a zero module 506, and a memory reservation module 508. In one embodiment, the power monitor module 502 monitors the primary power source 406 and recognizes a loss of primary power to the processor cache 402.

In one embodiment, the flush module 504 flushes modified data 424 from the processor cache 402 to the nonvolatile memory 404, such as battery-backed memory (BBM), in response to a loss of primary power to the processor cache 402. Alternatively, the flush module 504 flushes the modified data 424 in response to an operation to zero out the processor cache 402. In one embodiment, the flush module 504 flushes the modified data 424 to the flush memory segment 422, but not to the zero memory segment 420, of the nonvolatile memory 404.

In another embodiment, the flush module 504 flushes the modified data 424 from the processor cache 402 before any data is read from the memory 404 to the processor cache 402. In other words, the modified data 424 is flushed without the need for any RAM loads, in which data is read into the processor cache 402 from the memory 404 to force the processor cache 402 to flush the existing data 424.

In one embodiment, the zero module 506 executes an internal processor instruction to zero out the zero memory segment 420 of the memory 404 and, correspondingly, to zero out the processor cache 402. Furthermore, the zero module 506 may execute the zero out command in response to a loss of primary power to the processor cache 402.

In one embodiment, the memory reservation module 508 reserves the zero memory segment 420 within the nonvolatile memory 404. By reserving the zero memory segment 420, the memory reservation module 508 prevents critical data from being written to the zero memory segment 420 of the memory 404. In this way, critical data will not be lost if the zero memory segment 420 is zeroed out by the zero module 506. It may be possible, however, to use the zero memory segment as a scratch buffer during normal operation of the cache system 400.

In one embodiment, the memory reservation module 508 may reserve a zero memory segment 420 that is approximately equal to the size of the processor cache 402. Alternatively, the memory reservation module 508 may reserve a zero memory segment 420 that is larger than the size of the processor cache 402.

In one embodiment, the flush apparatus 500 is powered by the primary power source 406 during normal operation of the cache system 400. The flush apparatus 500 may be powered by a secondary power source if the primary power source 406 fails. For example, the flush apparatus 500 may be powered together with the processor cache 402 by the capacitor source 408. Alternatively, the flush apparatus 500 may be powered by another secondary power source.

Figure 6:
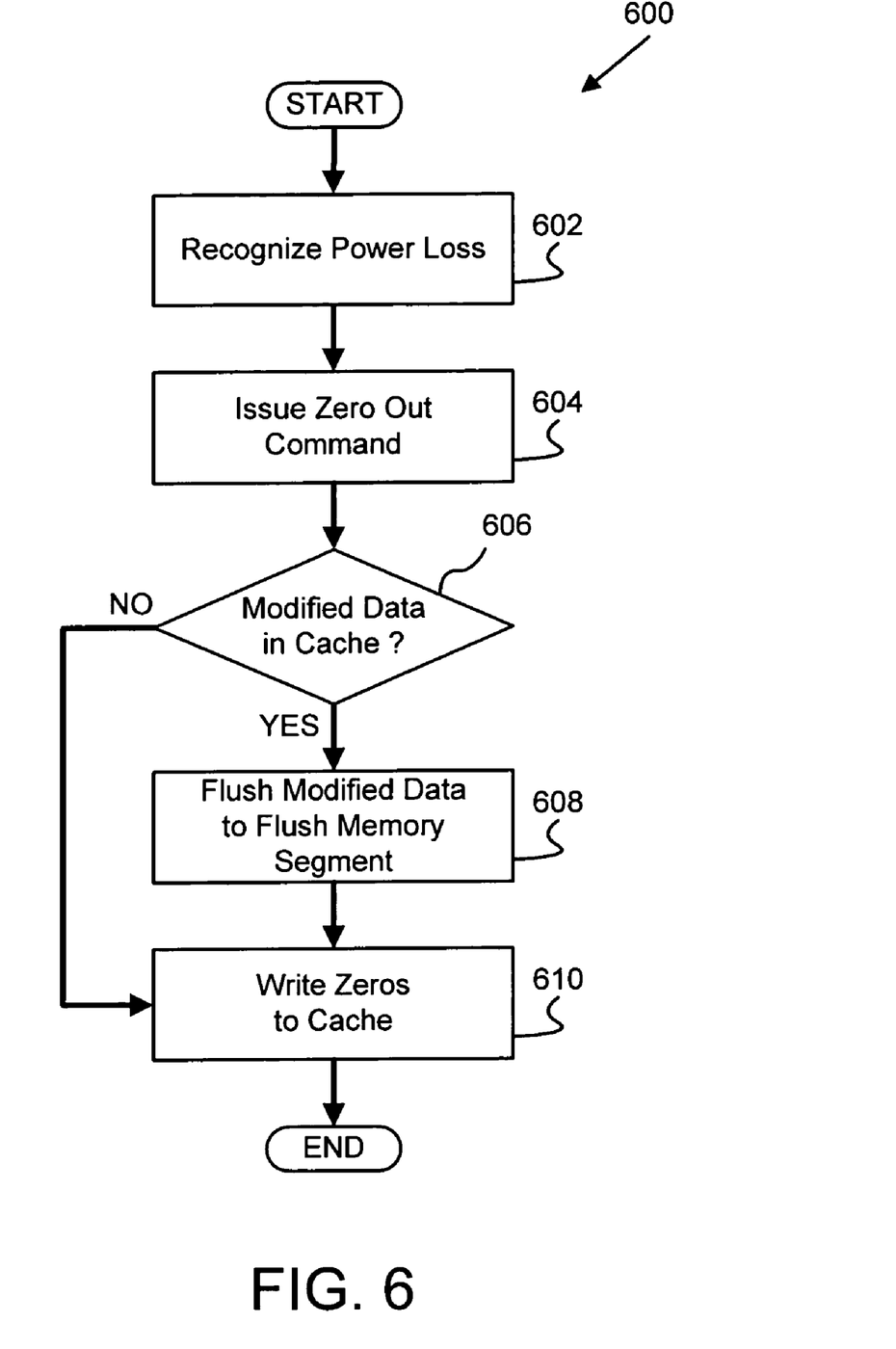
FIG. 6 is a schematic flow chart illustrating one embodiment of a cache flush method that may be implemented on the cache system of FIG. 4.

FIG. 6 depicts one embodiment of a cache flush method 600 that may be implemented on the cache system 400 of FIG. 4 in conjunction with the flush apparatus 500 of FIG. 5. Although the cache flush method 600 is described with specific reference to the cache system 400 and the flush apparatus 500, certain embodiments of the cache flush method 600 may be implemented in conjunction with alternative embodiments of the cache system 400 and/or the flush apparatus 500. Furthermore, although certain operations of the cache flush method 600 are described with specific reference to particular modules of the flush apparatus 500, other modules within the flush apparatus 500 or coupled to the cache system 400 also, or alternatively, may perform equivalent operations.

The illustrated cache flush method 600 begins as the power monitor module 502 recognizes 602 a loss of primary power to the processor cache 402. In response to the failure of the primary power source 406, the capacitor source 408 may automatically begin to power the processor cache 402 and, in one embodiment, the flush apparatus 500. Similarly, the battery source 410 may begin to power the memory 404.

In response to the recognition 602 of the power loss, the zero module 506 may issue 604 the zero out command or, alternatively, invoke the processor to issue 604 the zero out command. As described above, the zero out command may zero out one or more addresses in the memory 404, as well as zero out the processor cache 402. In order to zero out the processor cache 402, the zero module 604 may invoke the flush module 504 to determine 606 if any modified data 424 exists in the processor cache 402 and, if so, to flush 608 the modified data 424 to the flush memory segment 422 of the memory 404.

After the flush module 504 flushes 608 the modified data 424 from the processor cache 402, or if there is no modified data 424 in the processor cache 402, the zeros may be written 610 to the processor cache 402 according to the zero out instruction. The depicted cache flush method 600 then ends. It is possible that some of the zeros in the processor cache 402 may be written out to the memory 404. However, these zeros will only be written, if at all, to the zero memory segment 420 and will not affect any data 426 in the flush memory segment 422.

Hence, it may be advantageous to reserve the zero memory segment 420 of the memory 404 in order to protect any critical data 426 that may exist in the flush memory segment 422 of the memory 404. Additionally, it may be advantageous to have a zero memory segment 420 that is at least equal to the size of the processor cache 402 so that all of the data 424 within the processor cache 402 is flushed out to the flush memory segment 422 in response to the zero out command.

The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to flush cache data, the apparatus comprising:
   a zero module comprising a hardware circuit and configured to execute an internal processor instruction to zero out a zero memory segment of a nonvolatile memory and a processor cache in response to a loss of primary power to the processor cache; and
   a flush module comprising a hardware circuit and configured to flush modified data from an address in the processor cache to a flush memory segment of the nonvolatile memory before the zero module puts a zero in the address.

2. The apparatus of claim 1, further comprising a memory reservation module comprising a hardware circuit and configured to reserve the zero memory segment in the nonvolatile memory.

3. The apparatus of claim 1, wherein the zero memory segment is approximately equal in size to the processor cache.

4. The apparatus of claim 1, wherein the zero memory segment is larger in size than the processor cache.

5. The apparatus of claim 1, further comprising a power monitor module comprising a hardware circuit and configured to recognize the loss of primary power to the processor cache.

6. The apparatus of claim 1, wherein the nonvolatile memory is a random access memory (RAM) backed up by a battery.

7. The apparatus of claim 1, wherein the processor cache is backed up by a capacitor source in response to the loss of primary power to the processor cache.

8. The apparatus of claim 7, wherein the capacitor source is sized to back up the processor cache for a maximum time approximately equal to a write time to flush the modified data from every address in the processor cache.

9. The apparatus of claim 1, wherein the flush module is further configured to flush all of the modified data to the flush memory segment before the processor cache reads any data from the nonvolatile memory.

10. A system to flush cache data, the system comprising:
    a processor having a processor cache to store data;
    an internal processor instruction to zero out a zero memory segment of a nonvolatile memory coupled to the processor; and
    a flush apparatus to execute the zero out instruction and to flush modified data from an address in the processor cache to a flush memory segment of the nonvolatile memory in response to a loss of primary power to the processor.

11. The system of claim 10, wherein the zero memory segment is approximately equal in size to the processor cache.

12. The system of claim 10, further comprising a capacitor source to back up the processor in response to the loss of primary power.

13. The apparatus of claim 10, wherein the processor is a storage controller processor.

14. A system to synchronize cache data, the system comprising:
    a storage controller;
    a processor within the storage controller;
    a processor cache coupled to the processor, the processor cache configured to store data;
    a nonvolatile memory having a zero memory segment and a flush memory segment; and
    a flush apparatus to zero out the processor cache and to flush modified data from an address in the processor cache to the flush memory segment in response to a loss of primary power to the processor cache.

15. The system of claim 14, further comprising a capacitor source coupled to the processor cache, the capacitor source sized to back up the processor cache.

16. The system of claim 14, further comprising a battery coupled to the nonvolatile memory, the battery to provide backup power to the nonvolatile memory in response to the loss of primary power to the processor cache.

17. The system of claim 14, wherein the zero memory segment is approximately equal in size to the processor cache.

18. A program of machine-readable instructions stored in a storage medium, the machine-readable instructions executing on a digital processing apparatus and configured to cause the digital processing apparatus to:
    execute an internal processor instruction to zero out a zero memory segment of a nonvolatile memory and a processor cache in response to a loss of primary power to the processor cache; and
    flush modified data from an address in the processor cache to a flush memory segment of the nonvolatile memory before the zero module puts a zero in the address.

19. The program of machine-readable instructions of claim 18, wherein the instructions further cause the digital processing apparatus to reserve the zero memory segment in the nonvolatile memory.

20. The program of machine-readable instructions of claim 19, wherein the zero memory segment is approximately equal in size to the processor cache.

21. The program of machine-readable instructions of claim 19, wherein zero memory segment is larger in size than the processor cache.

22. The program of machine-readable instructions of claim 18, wherein the instructions further cause the digital processing apparatus to recognize the loss of primary power to the processor cache.

23. The program of machine-readable instructions of claim 18, wherein the nonvolatile memory is a random access memory (RAM) backed up by a battery.

24. The program of machine-readable instructions of claim 18, wherein the processor cache is backed up by a capacitor source in response to the loss of primary power to the processor cache.

25. The program of machine-readable instructions of claim 24, wherein the capacitor source is sized to back up the processor cache for a maximum time approximately equal to a write time to flush the modified data from every address in the processor cache.

26. The program of machine-readable instructions of claim 18, wherein the instructions further cause the digital processing apparatus to flush all of the modified data to the flush memory segment before the processor cache reads any data from the nonvolatile memory.

27. A method for deploying computer infrastructure, comprising integrating computer-readable code into a computing system, wherein the code in combination with the computing system is capable of flushing cache data by performing the following:
   executing an internal processor instruction to zero out a zero memory segment of a nonvolatile memory and a processor cache in response to a loss of primary power to the processor cache; and
   flushing modified data from an address in the processor cache to a flush memory segment of the nonvolatile memory before the zero module puts a zero in the address.

28. The method of claim 27, wherein the code in combination with the computing system is further capable of reserving the zero memory segment in the nonvolatile memory.

29. The method of claim 27, wherein the code in combination with the computing system is further capable of recognizing the loss of primary power to the processor cache.

30. The method of claim 27, wherein the code in combination with the computing system is further capable of flushing all of the modified data to the flush memory segment before the processor cache reads any data from the nonvolatile memory.

31. An apparatus to synchronize cache data, the apparatus comprising:
   means for executing an internal processor instruction to zero out a zero memory segment of a nonvolatile memory and a processor cache in response to a loss of primary power to the processor cache, the executing means comprising a hardware circuit; and
   means for flushing modified data from an address in the processor cache to a flush memory segment of the nonvolatile memory before the zero module puts a zero in the address, the flushing means comprising a hardware circuit.

* * * * *